July 7, 1925.　　　　　　　　　　　　　　　　　　　1,544,925
S. NELSON
EYEGLASSES OR GOGGLES
Filed May 19, 1924
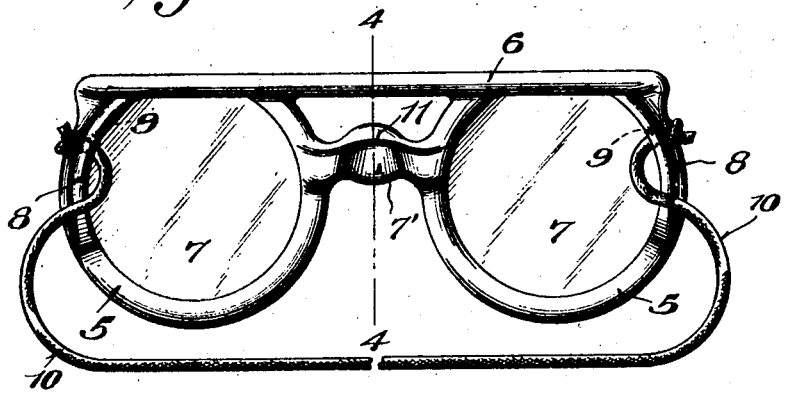
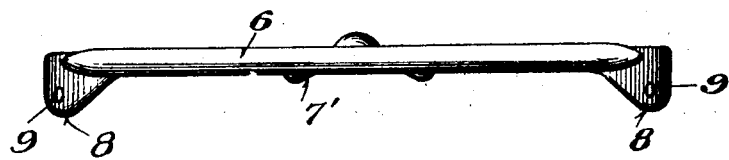
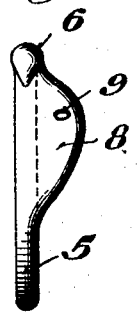
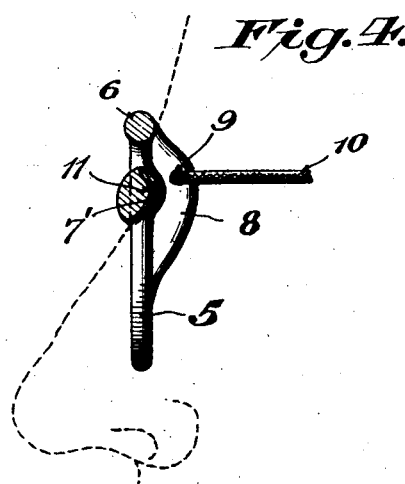
Inventor
Samuel Nelson,
Attorney Patented July 7, 1925.

1,544,925

UNITED STATES PATENT OFFICE.

SAMUEL NELSON, OF WATERLOO, IOWA.

EYEGLASSES OR GOGGLES.

Application filed May 19, 1924. Serial No. 714,509.

*To all whom it may concern:*

Be it known that I, SAMUEL NELSON, a citizen of the United States, residing at Waterloo, in the county of Blackhawk and State of Iowa, have invented certain new and useful Improvements in Eyeglasses or Goggles, of which the following is a specification.

My invention relates to improvements in eye glasses or goggles.

An important object of the invention is to provide means whereby the frame of the glasses or goggles may be held in place upon the user, by an elastic element or band, encircling the head, so that the frame may be conveniently shifted upwardly upon the forehead, and when in position upon the nose, will be comfortable, and retained in a position for proper use.

Other objects and advantages of the invention will be apparent during the course of the following description.

In the accompanying drawings forming a part of this specification, and in which like numerals are employed to designate like parts throughout the same, Figure 1 is an elevation of the inner side of the glasses or goggles, Figure 2 is a plan view of the same, Figure 3 is an end elevation of the same, and, Figure 4 is a transverse section taken on line 4—4 of Figure 1, showing the glasses in use.

The glasses or goggles embody lens frames 5, which are circularly curved, and are connected at their tops, with a straight forehead engaging bar 6, preferably intersecting therewith and formed integral with the same. The frames 5 receive and hold lenses 7 of any desired character or construction, either plain or colored. The frames 5 are connected at their inner sides by a nose bridge 7, preferably formed integral therewith. This nose bridge is arranged beneath and spaced from the forehead engaging bar 6, as shown.

Formed upon the outer sides of the frames 5 are lugs 8, preferably formed integral therewith, and these lugs are provided with apertures 9, for the reception of the ends of an elastic element 10, such as an elastic cord or band. This elastic cord or band is adapted to encircle the head of the wearer. It is preferred to employ the lugs 8, as they extend rearwardly beyond the lenses 7, and hence entirely out of the vision of the user. An important feature of the invention is the location of the apertures 9 or points of attachment of the flexible elastic element 10. These openings 9 are above the center of the lenses and also above the center of the nose engaging portion 11 of the bridge 7. This elevated arrangement of these openings, serve to properly distribute the pull from the elastic element 5. This pull is distributed between the forehead engaging bar 6 and the nose bridge. The frame will turn about the forehead engaging bar 6 and, as above stated, the pull is distributed upon the bar 6 and the nose bridge, and the pull upon the nose bridge is sufficient to retain the same in proper engagement with the nose, but not to exert excessive pressure upon the nose. When it is desired to shift the glasses out of the vision, the user may readily push the same upwardly upon his forehead, and of course they will be held thereon by the elastic band.

It is to be understood that the form of this invention herewith shown and described is to be taken as a preferred embodiment of the same, and that various changes in the shape, size, and arrangement of parts, may be resorted to, without departing from the spirit of my invention, or the scope of the subjoined claim.

Having thus described my invention, I claim:

Eye glasses or goggles comprising a pair of lens frames, a straight cylindrical forward engaging bar rigidly attached to the top of the frames, said bar being adapted to turn upon its longitudinal axis upon the forehead, a nose bridge connecting the frames beneath the bar, said frames, bar, and bridge being disposed in substantially the same plane, and an elastic head encircling band attached to the outer sides of the frames at an elevation between the said bar and nose bridge, whereby the band may retain the glasses in the lowered position and will also hold them in place when they are turned upwardly upon the forehead and rotated about the bar.

In testimony whereof I affix my signature.

SAMUEL NELSON.